United States Patent [19]

Iwanaga

[11] Patent Number: 5,051,854
[45] Date of Patent: Sep. 24, 1991

[54] MAGNETIC HEAD DEVICE

[75] Inventor: Atsushi Iwanaga, Furukawa, Japan

[73] Assignee: Alps Electric Co., Ltd., Tokyo, Japan

[21] Appl. No.: 506,502

[22] Filed: Apr. 5, 1990

Related U.S. Application Data

[63] Continuation of Ser. No. 823,665, Jan. 29, 1986, abandoned.

[30] Foreign Application Priority Data

Jan. 29, 1985 [JP] Japan .................. 60-10794

[51] Int. Cl.$^5$ ............ G11B 5/54; G11B 21/22
[52] U.S. Cl. .................. 360/105; 360/97.02; 360/104
[58] Field of Search ............ 360/104, 105-106, 360/109, 97.01, 97.02, 98.04-98.06, 99.02, 99.06, 99.07

[56] References Cited

U.S. PATENT DOCUMENTS

| 3,769,467 | 10/1973 | Gabor | 360/106 |
| 4,218,714 | 8/1980 | Isozaki et al. | 360/106 |
| 4,237,504 | 12/1980 | Ho et al. | 360/106 |
| 4,630,155 | 12/1986 | Hasegawa et al. | 360/106 |
| 4,647,998 | 3/1987 | Onohara et al. | 360/105 |

FOREIGN PATENT DOCUMENTS

| EP101616 | 2/1984 | European Pat. Off. | 360/106 |
| 58-153271 | 9/1983 | Japan | 360/104 |

Primary Examiner—John H. Wolff
Attorney, Agent, or Firm—Guy W. Shoup; Norman R. Klivans

[57] ABSTRACT

Disclosed herein is an improvement in a magnetic head device including a carriage, a lower head mounted to the carriage, an upper head arranged in opposed relation with the lower head, a rotating arm having the upper head, and a biasing means for pulling down the rotating arm and biasing the upper head against the lower head. The improvement comprises a shock absorbing member provided on an upper surface of the rotating arm.

1 Claim, 2 Drawing Sheets

MAGNETIC HEAD DEVICE

This application is a continuation of application Ser. No. 06/823,665, filed 01/29/86 now abandoned.

BACKGROUND OF THE INVENTION (1) Field of the Invention

This invention relates to a magnetic head device, and more particularly to an improvement of a shock absorbing member for a magnetic head loading arm in the magnetic head device in a magnetic disc recording-/regenerating apparatus which device allows a flexible magnetic disc to be held between a lower head and a upper head and functions to read and write information.

(2) Description of the Prior Art

Conventionally, there is known this kind of magnetic head device as shown in FIGS. 3 and 4. In the drawing, a carriage 1 includes a substrate 2 formed of synthetic resin which is an insulating material. The substrate 2 is designed to be moved along a guide shaft 3 in a radial direction of a magnetic disc 15 by a stepping motor (not shown).

A rotating arm 4 is biased to the carriage 1 side by a tension spring 5 provided between each rear portion of the rotating arm 4 and the substrate 2. The rotating arm 4 includes a substrate 6 formed of synthetic resin which is an insulating material. There is provided a lifting arm 7 for upwardly rotating the rotating arm 4 on an upper surface of the substrate 6 at a rear portion thereof.

A lower head 8 is mounted on an upper surface of the substrate 2 of the carriage 1 at a front portion thereof, and an upper head 9 is mounted on a lower surface of the rotating arm 4 at a front portion thereof in such a manner as to be opposed to the lower head 8 and hold the magnetic disc 15.

Reference numeral 10 designates a leaf hinge spring formed of a metal plate. The leaf hinge spring 10 is fixed at its front end to a rear end of the substrate 6 of the rotating arm 4 by means of a screw 11 and a nut 12, and is fixed at its rear end through a bracket 13 to the carriage 1 by means of a screw 14.

As shown in FIG. 3, when the magnetic disc 15 is inserted to be clamped, it is held by the lower head 8 and the upper head 9 thereby to allow reading and writing of information. On the other hand, when the magnetic disc 15 is in uninserted condition, the lifting arm 7 is lifted by a lifting mechanism (not shown) to upwardly rotate the rotating arm 4 and retain the upper head 9 at a fixed distance from the lower head 8. Thus, the upper head 9 is restricted in this position.

However, in the conventional magnetic head device, when the rotating arm 4 is upwardly lifted and rotated, the upper front surface of the rotating arm 4 collides with a cover 16, resulting in damage of the rotating arm 4 and slippage of a reference position of the upper head 9.

SUMMARY OF THE INVENTION

Accordingly, it is an object of the present invention to provide a magnetic head device which may absorb shock due to collision of the rotating arm with the cover when the rotating arm is upwardly lifted to be rotated, thereby preventing damage of the rotating arm and slippage of the reference position of the upper head 9.

According to the present invention, in a magnetic head device including a carriage, a lower head mounted to the carriage, an upper head arranged in opposed relation with the lower head, a rotating arm having the upper head, and a biasing means for pulling down the rotating arm and biasing the upper head against the lower head, an improvement comprises shock absorbing member provided on a upper surface of the rotating arm.

Other objects and advantages of the invention will become apparent from the following description and accompanying drawing.

DETAILED DESCRIPTION OF THE PREFERRED EMBODIMENT

Figure 1:
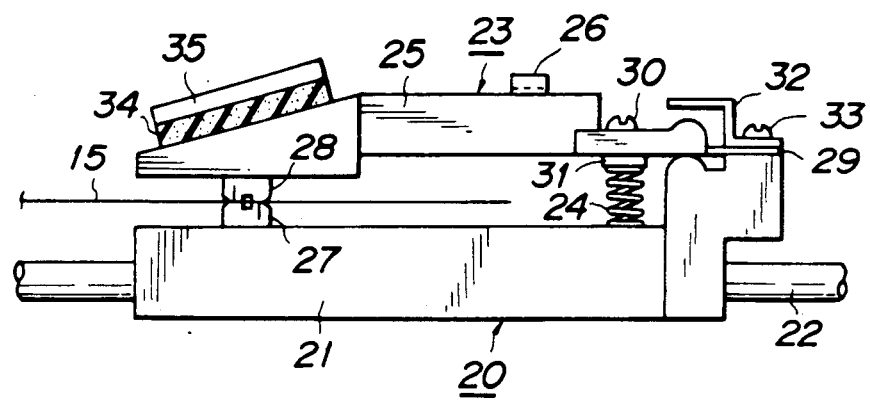
FIG. 1 is a side view of the magnetic head device according to the present invention with the magnetic disc inserted therein.
Figure 2:
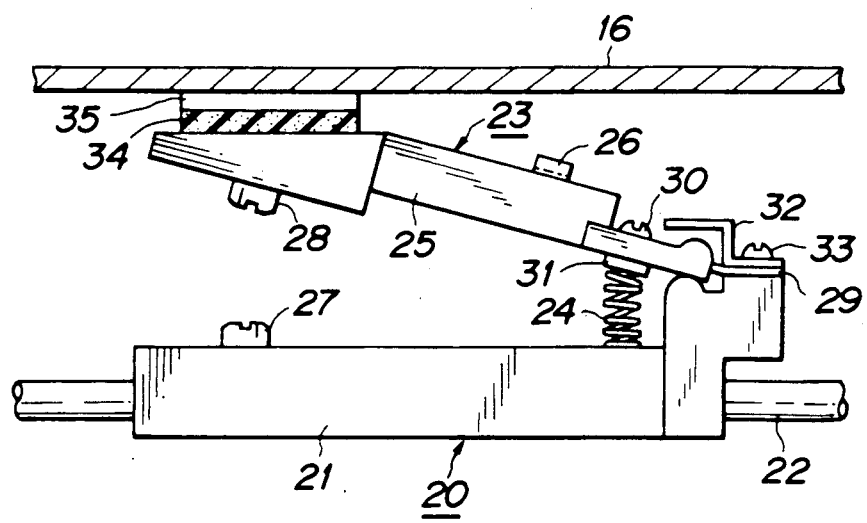
FIG. 2 is a side view similar to FIG. 1 with the magnetic disc uninserted in the magnetic head device.
Figure 3:
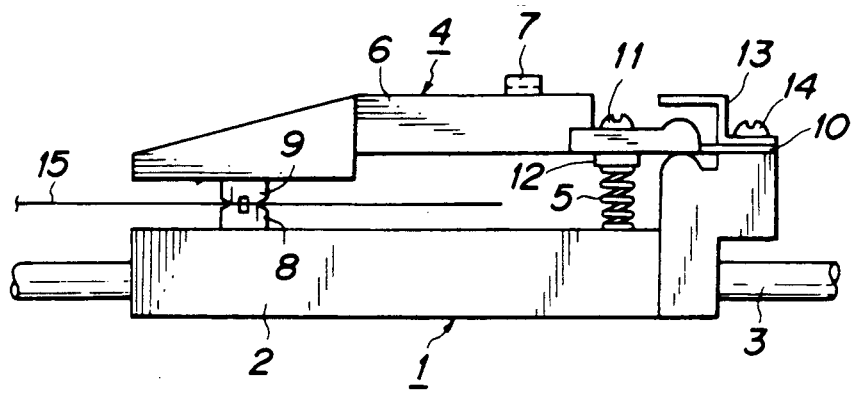
FIG. 3 is a side view of the magnetic head device in the prior art with the magnetic disc inserted therein.
Figure 4:
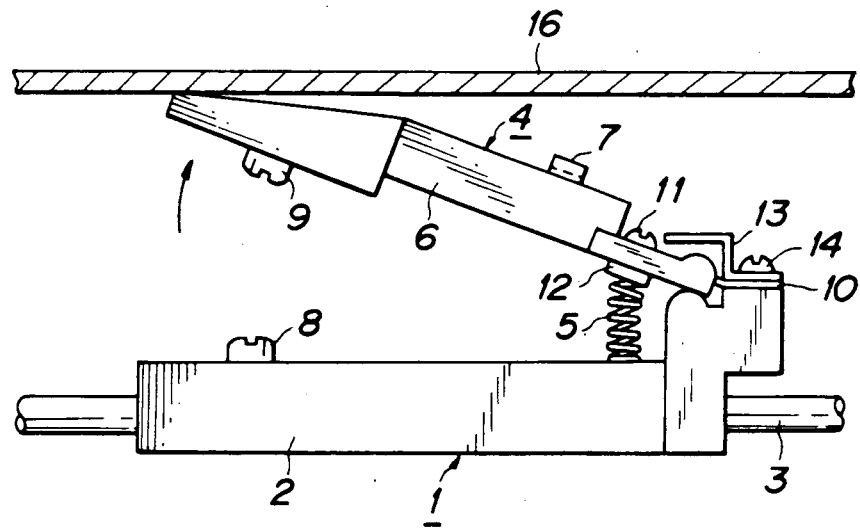
FIG. 4 is a side view similar to FIG. 3 with the magnetic disc uninserted in the magnetic head device.

Referring to FIGS. 1 and 2, a carriage 20 includes a substrate 21 formed of synthetic resin which is an insulating material. The substrate 21 is designed to be moved along a guide shaft 32 in a radial direction of a magnetic disc 15 by a stepping motor (not shown).

A rotating arm 23 is biased to the carriage 20 side by a tension spring 24 provided between each rear portion of the rotating arm 23 and the substrate 21. The rotating arm 23 includes a substrate 25 formed of synthetic resin which is an insulating material. There is provided a lifting arm 26 for upwardly rotating the rotating arm 23 on an upper surface of the substrate 25 at a rear portion thereof.

A lower head 27 is mounted on an upper surface of the substrate 21 of the carriage 20 at a front portion thereof, and an upper head 28 is mounted on a lower surface of the rotating arm 23 at a front portion thereof in such a manner as to be opposed to the lower head 27 and hold the magnetic disc 15.

Reference numeral 29 designates a leaf hinge spring formed of a metal plate. The leaf hinge spring 29 is fixed at its front end to a rear end of the substrate 25 of the rotating arm 23 by means of a screw 30 and a nut 31 and is fixed at its rear end through a bracket 32 to the carriage 20 by means of a screw 33.

There is provided a sponge member 34 laminated to a rubber member 35 on the upper front surface of the rotating arm 23.

As shown in FIG. 1, when the magnetic disc 15 is inserted to be clamped, it is held by the lower head 27 and the upper head 28 thereby to allow reading and writing of information. On the other hand, when the magnetic disc 15 is in uninserted condition, the lifting arm 26 is lifted by a lifting mechanism (not shown) to upwardly rotate the rotating arm 23 and retain the upper head 28 at a fixed distance from the lower head 27. Thus, the upper head 28 is restricted in this position.

Further, when the rotating arm 23 is upwardly lifted and rotated, a shock absorbing member formed by lamination of the sponge member 34 and the rubber member 35 mounted on the rotating arm 23 comes into abutment against the cover 16 thereby to absorb shock due to collision of the rotating arm 23 with the cover 16.

In this manner, as the rubber member 35 is laminated on the sponge member 34, the rubber member 35 directly abuts against the cover 16 thereby to prevent slip and further prevent bouncing of the rubber member 35 by the sponge member 34.

Although the shock absorbing member in this embodiment is formed by lamination of the sponge member 34 and the rubber member 35, it is not limited to such lamination, but any other cushion materials may be naturally used.

While the invention has been described with reference to specific embodiment, the description is illustrative and is not to be construed as limiting the scope of the invention. Various modifications and changes may occur to those skilled in the art without departing from the spirit and scope of the invention as defined by the appended claims.

What is claimed is:

1. A magnetic head device having:
    a chassis having an upper wall and lower base;
    a carriage movably mounted on said base and supporting a lower magnetic head on an upper surface thereof;
    an upper arm supporting an upper magnetic head on a lower surface thereof which is pivotably mounted to said carriage such that when said upper arm is lowered toward said carriage, said upper head becomes opposed to said lower head for recording and reproducing on a magnetic disk interposed therebetween; and
    biasing means for biasing said upper arm toward said carriage;
    wherein the improvement comprises a shock absorbing member provided on an upper surface of said upper arm facing said upper wall such that when said upper arm is lifted away from said carriage in an upward direction toward said upper wall of said chassis, said shock absorbing member becomes interposed between said upper arm and said upper wall so as to absorb the shock of any collision therebetween; and
    wherein said two layered shock absorbing member includes a soft sponge member attached on said upper surface of said upper arm and a substantially coextensive harder rubber member laminated on said sponge member, whereby only said rubber member contacts said upper wall when said upper arm is lifted away from said chassis, to prevent slippage and/or bouncing, thereby providing superior cushioning.

* * * * *